(12) United States Patent
Lee et al.

(10) Patent No.: US 7,638,241 B2
(45) Date of Patent: Dec. 29, 2009

(54) ORGANIC/INORGANIC COMPOSITE SEPARATOR HAVING MORPHOLOGY GRADIENT, MANUFACTURING METHOD THEREOF AND ELECTROCHEMICAL DEVICE CONTAINING THE SAME

(75) Inventors: Sang-Young Lee, Daejeon (KR); Dae-Jong Seo, Daejeon (KR); Joon-Yong Sohn, Busan (KR); Seok-Koo Kim, Daejeon (KR); Jang-Hyuk Hong, Daejeon (KR); Young-Soo Kim, Yangsan-si (KR); Hyun-Min Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 23 days.

(21) Appl. No.: 11/997,948

(22) PCT Filed: Dec. 6, 2006

(86) PCT No.: PCT/KR2006/005222

§ 371 (c)(1),
(2), (4) Date: Feb. 5, 2008

(87) PCT Pub. No.: WO2007/066967

PCT Pub. Date: Jun. 14, 2007

(65) Prior Publication Data

US 2008/0292968 A1 Nov. 27, 2008

(30) Foreign Application Priority Data

Dec. 6, 2005 (KR) .................. 10-2005-0118315

(51) Int. Cl.
H01M 2/16 (2006.01)
H01M 2/14 (2006.01)

(52) U.S. Cl. .................. 429/251; 429/129; 429/247

(58) Field of Classification Search ............. 429/129, 429/232, 247; 29/623.1, 623.5; 428/212, 428/218, 304.4, 306.6, 307.3, 312.2
See application file for complete search history.

(56) References Cited

U.S. PATENT DOCUMENTS

| 4,322,524 A | * | 3/1982 | Onda et al. | ............. 536/55 |
| 6,242,135 B1 | * | 6/2001 | Mushiake | ............. 429/304 |
| 2002/0102455 A1 | | 8/2002 | Daroux et al. | |
| 2004/0200355 A1 | | 10/2004 | Kim et al. | |
| 2004/0214089 A1 | | 10/2004 | Lee et al. | |

FOREIGN PATENT DOCUMENTS

| JP | 6-236752 | * | 8/1994 |
| KR | 10-2004-0089186 A | * | 10/2004 |
| KR | 10-2004-0089187 A | * | 10/2004 |

OTHER PUBLICATIONS

International Search report for PCT/KR2006/005222 dated Mar. 19, 2007.
Written Opinion for PCT/KR2006/005222 dated Mar. 19, 2007.

* cited by examiner

*Primary Examiner*—Patrick Ryan
*Assistant Examiner*—Julian Mercado
(74) *Attorney, Agent, or Firm*—Birch, Stewart, Kolasch & Birch, LLP

(57) ABSTRACT

Disclosed is an organic/inorganic composite separator including: a porous substrate having pores; and a porous active layer containing a mixture of inorganic particles and a binder polymer with which at least one surface of the porous substrate is coated. The organic/inorganic composite separator of the present invention may be useful to enhance peeling and scratch resistances and improve a lamination characteristic by introducing a porous active layer onto a porous substrate having pores, the porous active layer having heterogeneity of morphology toward a thickness direction in which a content ratio of the binder polymer/inorganic particles present in a surface layer is higher than that of the binder polymer/inorganic particles present inside the surface layer. Accordingly, the stability and performances of a battery can be improved together since the detachment of inorganic particles from the porous active layer may be reduced during the assembly process of the electrochemical device.

36 Claims, 2 Drawing Sheets (A)     (B)

(A)  (B)

(A)  (B)

(A)  (B)

ORGANIC/INORGANIC COMPOSITE SEPARATOR HAVING MORPHOLOGY GRADIENT, MANUFACTURING METHOD THEREOF AND ELECTROCHEMICAL DEVICE CONTAINING THE SAME

TECHNICAL FIELD

The present invention relates to a separator of an electrochemical device such as a lithium secondary battery, a manufacturing method thereof and an electrochemical device containing the same, and more particularly to an organic/inorganic composite separator in which a porous active layer is coated with a mixture of an inorganic material and a polymer onto a surface of a porous substrate, a manufacturing method thereof and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, the research and development into a novel electrode and a novel battery that can improve capacity density and specific energy have been made intensively in the field of the secondary batteries.

Among currently used secondary batteries, lithium secondary batteries developed in early 1990's have a higher drive voltage and a much higher energy density than those of conventional batteries using an aqueous electrolyte solution (such as Ni—MH batteries, Ni—Cd batteries, $H_2SO_4$—Pb batteries, etc). For these reasons, the lithium secondary batteries have been advantageously used. However, such a lithium secondary battery has disadvantages in that organic electrolytes used therein may cause safety-related problems resulting in ignition and explosion of the batteries and that processes for manufacturing such a battery are complicated.

Recently, lithium-ion polymer batteries have been considered as one of the next-generation batteries since the above disadvantages of the lithium ion batteries were solved. However, the lithium-ion polymer batteries have a relatively lower battery capacity than those of the lithium ion batteries and an insufficient discharging capacity in low temperature, and therefore these disadvantages of the lithium-ion polymer batteries remain to be urgently solved.

Such a battery has been produced from many companies, and the battery stability has different phases in the lithium-ion polymer batteries. Accordingly, it is important to evaluate and ensure the stability of the lithium-ion polymer batteries. First of all, it should be considered that errors in operation of the batteries should not cause damage to users. For this purpose, the Safety and Regulation strictly regulate the ignition and the explosion in the batteries.

In order to solve the above battery safety-related problem, there has been proposed an organic/inorganic composite separator having a porous active layer formed by coating at least one surface of a porous substrate having pores with a mixture of inorganic particles and a binder polymer. The porous active layer formed of this conventional organic/inorganic composite separator shows homogeneous composition morphology toward a thickness direction, as shown in FIG. 2B and FIG. 3B. However, if the electrochemical device is assembled with the organic/inorganic composite separator, it has disadvantages in that inorganic particles in the porous active layer are detached and a lamination characteristic toward electrodes is deteriorated during a winding process, etc. If a content of a binder polymer in the porous active layer is increased so as to solve the above disadvantages, characteristics such as the peeling and scratch resistances, the lamination characteristic toward electrodes, etc. in the assembly process of the electrochemical device may be rather improved, but porosities in the porous active layer are decreased since the inorganic particles are present in a relatively lower content, resulting in deterioration in performances of the electrochemical device, and the safety of the separator is also reduced due to the introduction of the porous active layer.

DISCLOSURE OF INVENTION

The present invention is designed to solve the problems of the prior art, and therefore the first object of the invention is to provide an organic/inorganic composite separator capable of improving characteristics in an assembly process of an electrochemical device without any increase in the content of a binder polymer so that a porous active layer with which at least on surface of the organic/inorganic composite separator is coated can maintain sufficient porosities, a manufacturing method thereof and an electrochemical device containing the same.

The present invention is designed to solve the problems of the prior art, and therefore the second object of the invention is to provide a method for manufacturing an organic/inorganic composite separator having characteristics as described in the first object by undergoing only a single coating process.

In order to accomplish the first object, the present invention provides an organic/inorganic composite separator including: (a) a porous substrate having pores; and (b) a porous active layer containing a mixture of inorganic particles and a binder polymer with which at least one surface of the porous substrate is coated, wherein the porous active layer shows heterogeneity of composition morphology toward a thickness direction in which a content ratio of the binder polymer/inorganic particles present in a surface region of the porous active layer is higher than that of the binder polymer/inorganic particles present inside the porous active layer, a manufacturing method thereof and an electrochemical device containing the organic/inorganic composite separator.

The above-mentioned organic/inorganic composite separator of the present invention may enhance peeling and scratch resistances of the porous active layer and improve a lamination characteristic toward electrodes by introducing a porous active layer onto a porous substrate having pores, the porous active layer having heterogeneity of morphology toward a thickness direction in which a content ratio of the binder polymer/inorganic particles present in a surface layer is higher than that of the binder polymer/inorganic particles present inside the surface layer. Accordingly, stability and performances of the battery can be all improved together since the detachment of inorganic particles from the porous active layer may be reduced in the assembly process of the electrochemical device.

In the organic/inorganic composite separator of the present invention, a first binder polymer is preferably used as the binder polymer, the first binder polymer containing together at least one functional group selected from the group consisting of carboxy, maleic anhydride and hydroxy; and at least one functional group selected from the group consisting of cyano and acrylate. Such a first binder polymer includes cyanoethylpullulan, cyanoethylpolyvinylalcohol, cyanoethylcellulose, cyanoethylsucrose, etc.

In the organic/inorganic composite separator of the present invention, a second binder polymer having a solubility parameter of 17 to 27 MPa$^{1/2}$ is preferably used as the binder polymer together with the above-mentioned binder polymer in the aspect of electrochemical stability of the porous coating layer. Such a second binder polymer includes polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, etc.

In order to accomplish the second object, the present invention provides a method for manufacturing an organic/inorganic composite separator including a porous active layer, the method including: (S1) preparing a solution of a first binder polymer containing together at least one functional group selected from the group consisting of carboxy, maleic anhydride and hydroxy; and at least one functional group selected from the group consisting of cyano and acrylate; (S2) adding inorganic particles to the solution of the first binder polymer and dispersing the inorganic particles in the solution of the first binder polymer; (S3) coating the solution of the first binder polymer having inorganic particles dispersed therein with a film and drying the coated film, wherein the porous active layer shows heterogeneity of morphology toward a thickness direction in which a content ratio of the first binder polymer/inorganic particles present in a surface region of the porous active layer is higher than that of the first binder polymer/inorganic particles present inside the porous active layer.

In the method for manufacturing an organic/inorganic composite separator of the present invention, the second binder polymer having a solubility parameter of 17 to 27 MPa$^{1/2}$ is preferably further dissolved in the solution of the first binder polymer in the aspect of electrochemical stability of the porous coating layer.

BRIEF DESCRIPTION OF THE DRAWINGS

These and other features, aspects, and advantages of preferred embodiments of the present invention will be more fully described in the following detailed description, taken accompanying drawings. In the drawings:

FIG. 2A is a magnified photograph showing a surface of the porous active layer having heterogeneity of morphology toward a thickness direction prepared in Example 1, and FIG. 2B is a magnified photograph showing a surface of a conventional porous active layer.

FIG. 3A is a magnified photograph showing a surface of the porous active layer having heterogeneity of morphology toward a thickness direction prepared in Example 1, and FIG. 3B is a magnified photograph showing a surface of a conventional porous active layer.

BEST MODES FOR CARRYING OUT THE INVENTION

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Unlike conventional composite separators, such as a polyolefin separator having a porous active layer, wherein the porous active layer has homogeneous morphology toward a thickness direction is simply formed on a porous substrate, the present invention provides an organic/inorganic composite separator including a porous active layer having heterogeneity of composition morphology toward a thickness direction in which a content ratio of the binder polymer/inorganic particles present in a surface region of the porous active layer is higher than that of the binder polymer/inorganic particles present inside the porous active layer.

Figure 1:
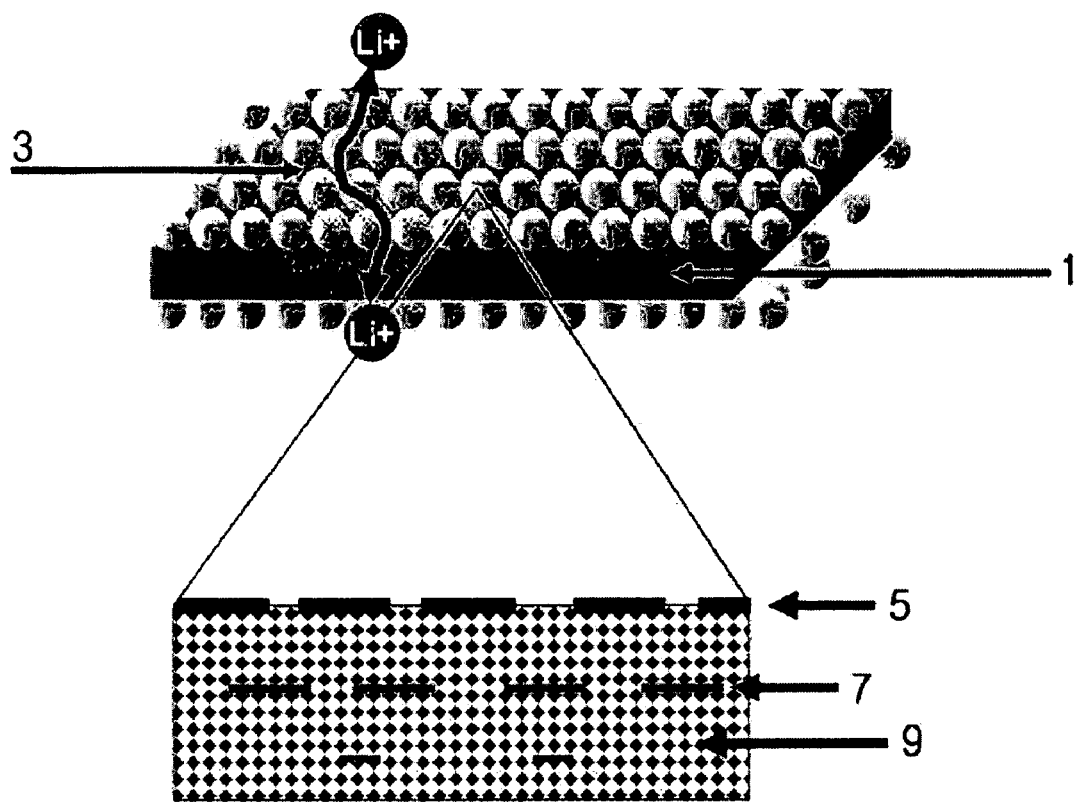
FIG. 1 is a diagram showing a cross-sectional view of an organic/inorganic composite separator according to the present invention and a schematic view of an active layer having heterogeneity of morphology toward a thickness direction.
Figure 4:
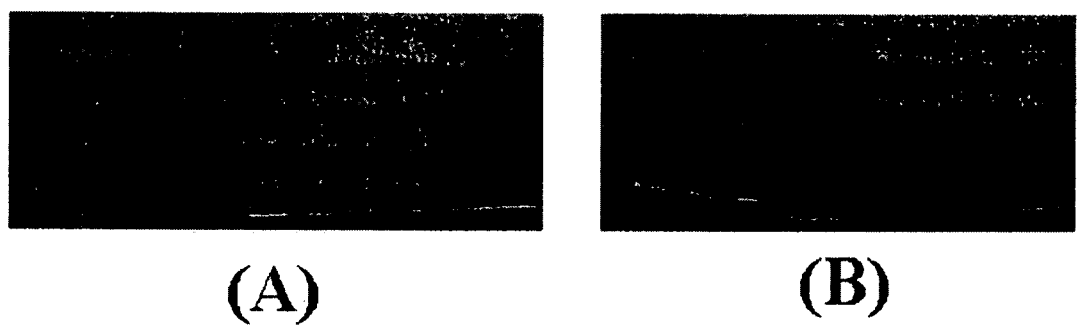
FIG. 4A is a photograph showing a peeling characteristic in a surface of an organic/inorganic composite separator prepared in Example 1, wherein the organic/inorganic composite separator has a porous active layer formed therein, the porous active layer having heterogeneity of morphology toward a thickness direction.
FIG. 4B is a photograph showing a peeling characteristic in a surface of a conventional organic/inorganic composite separator, wherein the organic/inorganic composite separator has a composite coating layer formed therein, the composite coating layer being composed of an inorganic material and a polymer.

1) The organic/inorganic composite separator of the present invention includes a porous substrate 1 and a porous active layer 3 formed in at least one surface of the porous substrate 1, wherein the porous active layer 3 includes a polymer 5 and inorganic particles 9, the content ratios of the a polymer 5 and the inorganic particles 9 are varied toward a thickness direction, as shown in FIG. 1. Accordingly, the organic/inorganic composite separator has increased resistances to external stimuli such as a peeling resistance, a scratch resistance, etc. and an improved lamination characteristic toward electrodes due to adhesion characteristic of the polymer present in a large amount in the surface of the active layer. Therefore, the organic/inorganic composite separator of the present invention may exhibit very excellent characteristics in the assembly process of a battery such a winding process, a lamination process, etc. (see FIG. 4A). Also, the organic/inorganic composite separator of the present invention may have excellent ion conductivity since the heterogeneity of morphology toward a thickness direction enables the porosity of the active layer to become increased from its surface to its inside, thereby resulting in improved battery performances.

2) Also, the complete internal short-circuit between the electrodes is hard to occur because of the presence of an organic/inorganic composite porous active layer even if the porous substrate is ruptured inside of the battery, and the short-circuited area is not enlarged any more although a short-circuited phenomenon appears in the battery, resulting in improvement in safety of the battery.

In the application of the present invention, the expression "heterogeneity of morphology toward a thickness direction in which a content ratio of binder polymer/inorganic particles present in a surface region of a porous active layer is higher than that of binder polymer/inorganic particles present inside the porous active layer" should be understood to include all aspects if the organic/inorganic composite separator of the present invention is formed so that a content ratio of binder polymer/inorganic particles present in a surface of a porous active layer is higher than that of binder polymer/inorganic particles present beneath (inside) the surface of the porous active layer. For example, by the expression, it is meant that the organic/inorganic composite separator of the present invention includes all porous active layers including a porous active layer formed so that the content ratio of the binder polymer/inorganic particles is linearly decreased toward a direction from a surface of the porous active layer to the porous substrate; a porous active layer formed so that the content ratio of the binder polymer/inorganic particles is non-linearly decreased toward a direction from a surface of the porous active layer to the porous substrate; a porous active layer formed so that the content ratio of the binder polymer/ inorganic particles is non-continuously decreased toward a direction from a surface of the porous active layer to the porous substrate, etc.

In the application of the present invention, the content ratio of the binder polymer/inorganic particles is also determined on the basis of the entire surface region of the porous active layer since the binder resin present in the surface region of the porous active layer may not be partially homogenously mixed with the inorganic particles.

One of major components in the organic/inorganic composite separator according to the present invention are inorganic particles generally used in the art. The inorganic particles are the major components used to manufacture a final organic/inorganic composite separator, and serve to form micropores due to the presence of interstitial volumes among the inorganic particles. Also, the inorganic particles also serve as a kind of a spacer capable of maintaining a physical shape of a coating layer.

The inorganic particles used in the organic/inorganic composite separator of the present invention are stable in the electrochemical aspect, but the present invention is not particularly limited thereto. That is to say, the inorganic particles, which may be used in the present invention, is not limited if oxidation and/or reduction reactions do not take place within the operation voltage range (for example, 0~5V in a Li/Li$^+$ battery) of a battery to be applied. In particular, the inorganic particles having ion conductivity may improve performances of the organic/inorganic composite separator by enhancing ion conductivity in the electrochemical device.

Further, when inorganic particles having high dielectric constant are used, they can contribute to increasing the dissociation degree of an electrolyte salt in a liquid electrolyte, such as a lithium salt, thereby improving the ion conductivity of the electrolyte.

For these above reasons, the inorganic particles preferably include inorganic particles having a high dielectric constant of 5 or more, and more preferably 10 or more, inorganic particles having lithium conductivity or mixtures thereof. A non-limiting example of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof.

In particular, the above-described inorganic particles, for example $BaTiO_3$, Pb $(Zr,Ti)O_3$ (PZT), $Pb_{1-x}La_xZr_{1-y}Ti_yO_3$ (PLZT), PB $(Mg_3Nb_{2/3})O_3$—$PbTiO_3$ (PMN-PT) and hafnia ($HfO_2$), has a high dielectric constant of 100 or more. The inorganic particles also have piezoelectricity so that an electric potential between both surfaces can be generated in the presence of the generated charges when pressure is applied over a critical level. Therefore, the inorganic particles can prevent internal short circuit between both electrodes, thereby contributing to improving the safety of a battery. Additionally, when such inorganic particles having a high dielectric constant are mixed with inorganic particles having lithium ion conductivity, synergic effects may be obtained.

As used herein, "inorganic particles having lithium ion conductivity" are referred to as inorganic particles containing lithium ions and having a capability of transferring lithium ions without storing lithium. The inorganic particles having lithium ion conductivity can conduct and move lithium ions due to defects in their particle structure, and thus can improve lithium ion conductivity and contribute to improving battery performance. A non-limiting example of such inorganic particles having lithium ion conductivity includes: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as Lil-$Li_2S$—$P_2S_5$, or mixtures thereof.

Micropores may be formed by adjusting the sizes and contents of the inorganic particles and content of the binder polymer as the components of the organic/inorganic composite separator according to the present invention. And, the pore size and porosity of the micropores may also be adjusted.

Although there is no particular limitation in size of the inorganic particles, the inorganic particles preferably have a size of 0.001-10 μm for the purpose of forming a coating layer having a uniform thickness and providing a suitable porosity. If the size is less than 0.001 μm, physical properties of the porous active layer cannot be controlled with ease since the inorganic particles have poor dispersibility. If the size is greater than 10 μm, the resultant porous active layer has an increasing thickness, resulting in degradation in mechanical properties. Furthermore, such excessively large pores may increase a possibility of generating internal short circuit during repeated charge/discharge cycles.

As one of the major components in the organic/inorganic composite separator having heterogeneity of morphology toward a thickness direction according to the present invention, a first binder polymer is preferably used as the binder polymer, the first binder polymer including together at least one functional group selected from the group consisting of carboxy, maleic anhydride and hydroxy; and at least one functional group selected from the group consisting of cyano and acrylate. More preferably, first binder polymers containing a hydroxy group and a cyano group together, such as cyanoethylpullulan, cyanoethylpolyvinylalcohol, cyanoethylcellulose, cyanoethylsucrose, are used alone or in combinations thereof. If a coating solution using the first binder polymer having two predetermined functional groups is used herein, an organic/inorganic composite separator having heterogeneity of morphology toward a thickness direction is easily formed by only one coating by means of control of phase inversion, and a cohesion force among the inorganic particles, an adhesion force between the porous active layer and the porous substrate and a lamination characteristic toward electrodes are further improved.

In the manufacturing process of a battery, one of the very important characteristics is particularly the lamination to electrodes of the porous active layer formed in the organic/inorganic composite separator. The lamination characteristic toward electrodes is evaluated by measuring an adhesion force between separators, namely an adhesion force between two separators after a separator is adhered to another separator at 100° C. under a pressure of 5.0 kgf/cm$^2$. The porous active layer, formed in the organic/inorganic composite separator of the present invention under the above-mentioned conditions, preferably has an adhesion force of 5 gf/cm or more.

Also, it is not essential to use a binder polymer having ion conductivity, used in the porous active layer having heterogeneity of morphology toward a thickness direction of the present invention. However, when the binder polymer has ion conductivity, it can further improve performances of an electrochemical device. Therefore, the binder polymer preferably has a dielectric constant as high as possible. Because a dissociation degree of a salt in an electrolyte depends on a dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

Also, the above mentioned first binder polymer is preferably used in combination with a second binder polymer having a solubility parameter of 17 to 27 MPa$^{1/2}$ in the aspect of electrochemical safety of the porous coating layer. Such a second binder polymer includes polymers having a functional group selected from the group consisting of halogen, acrylate, acetate and cyano. More particularly, an example of the second binder polymer includes polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, etc.

If the first binder polymer and the second binder polymer are used together in the porous active layer having heterogeneity of morphology toward a thickness direction according to the present invention, a content ratio of the first binder polymer:the second binder polymer ranges from 0.1:99.9 to 99.9:0.1, and more preferably from 20.0:80.0 to 80.0:20.0.

There is no particular limitation in mixing ratio of inorganic particles to a binder polymer. However, the mixing ratio of inorganic particles to a binder polymer preferably ranges from 10:90 to 99:1, and more preferably ranges from 50:50 to 99:1. If the content of the inorganic particles is less than 10 parts by weight, interstitial volumes formed among inorganic particles may be decreased due to the presence of an excessively large amount of the polymer, thereby reducing the pore size and porosity of a coating layer, resulting in degradation in battery performance. If the content of the inorganic particles is greater than 99 parts by weight, an excessively low content of the polymer may cause the adhesion among inorganic particles to be weakened, resulting in degradation in mechanical properties of the resultant organic/inorganic composite separator.

There is no particular limitation in thickness of the active layer composed of the inorganic particles and the binder polymer, but the active layer preferably has a thickness of 0.01 and 100 µm. Also, there are no particular limitations in pore size and porosity of the active layer, but the active layer preferably has a pore size of 0.001 to 10 µm and a porosity of 5 to 95%. The active layer serve as a resistant layer if the pore size and the porosity of the active layer is less than 0.001 µm and 5%, respectively, while it is difficult to maintain mechanical properties of the active layer if the pore size and the porosity of the active layer is greater than 150 µm and 95%, respectively.

The organic/inorganic composite separator of the present invention further may include other additives, in addition to the inorganic particles and the polymer as the components in the active layer.

There is no particular limitation in selection of a porous substrate including the active layer having homogeneous composition morphology according to the present invention, as long as it includes a porous substrate having pores. A non-limiting example of the porous substrate includes polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, high-density polyethylene, low-density polyethylene, linear low-density polyethylene, ultrahigh molecular weight polyethylene, polypropylene and mixtures thereof, and other heat-resistant engineering plastics may be used without any limitation.

There is no particular limitation in thickness of the porous substrate, but the porous substrate preferably has a thickness of 1 to 100 µm, and more preferably 5 to 50 µm. It is difficult to maintain a mechanical property of the porous substrate if the thickness of the porous substrate is less than 1 µm, while the porous substrate serve as a resistant layer if the thickness of the porous substrate is greater than 100 µm.

There are no particular limitations in pore size and porosity of the porous substrate, but the porous substrate preferably has a porosity of 5 to 95%. The porous substrate preferably has a pore size (a diameter) of 0.01 to 50 µm, and more preferably 0.1 to 20 µm. The porous substrate serve as a resistant layer if the pore size and the porosity of the active layer is less than 0.01 µm and 10%, respectively, while it is difficult to maintain mechanical properties of the active layer if the pore size and the porosity of the active layer is greater than 50 µm and 95%, respectively.

The porous substrate may be in a form of a non-woven fabric or a membrane. If a non-woven fabric is used as the porous substrate, it can form a porous web. At this time, the non-woven fabric is preferably in a spunbond or melt blown shape composed of long fibers.

A spunbond process is carried out by undergoing a series of continuous procedures, for example by applying heat to a polymer to form a long fiber and stretching the long fiber with the hot air to form a web. A melt blown process is a process for spinning a polymer through a spinneret, wherein the polymer can form a fiber and the spinneret is formed of hundreds of small orifices. At this time, the resultant fiber is a three-dimensional fiber having a spider-web structure in which microfibers having a diameter of 10 µm or less are interconnected.

The organic/inorganic composite separator of the present invention, which is formed by coating the porous substrate with a mixture of the inorganic particles and the binder polymer, includes pores in the porous substrate and also has pores in the active layer formed on the porous substrate, as described above. A binder polymer preferably interconnects and fixes the inorganic particles, and the micropores are formed in the porous active layer due to the presence of interstitial volumes among the inorganic particles. The pore size and the porosity of the organic/inorganic composite separator depend mainly on the size of the inorganic particles. For example, if inorganic particles having a particle diameter of 1 µm or less are used, the pores formed thereby also have a size of 1 µm or less. The pore structure is filled with an electrolyte injected during a subsequent process and the injected electrolyte serves to transfer ions. Therefore, the pore size and the porosity are important factors in controlling the ion conductivity of the organic/inorganic composite separator. Preferably, the pores size and the porosity of the organic/inorganic composite separator according to the present invention preferably range from 0.001 to 10 µm and from 5 to 95%, respectively.

Also, there is no particular limitation in thickness of the organic/inorganic composite separator of the present invention, but the thickness of the organic/inorganic composite separator may be controlled depending on the performance of a battery. The organic/inorganic composite separator preferably has a thickness of 1 to 100 µm, and more preferably a thickness of 2 to 30 µm. The performance of a battery may be improved by controlling the thickness range of the organic/inorganic composite separator.

The organic/inorganic composite separator of the present invention may be used in a battery with a microporous separator, for example a polyolefin separator, depending on the characteristic of the resultant battery.

The organic/inorganic composite separator including a porous active layer having heterogeneity of composition morphology toward a thickness direction according to the present invention may be manufactured according to the following methods, but the present invention is not limited thereto.

As the first method, a method for manufacturing an organic/inorganic composite separator having a porous active layer is described, as follows. In this manufacturing method, the porous active layer is formed in the organic/inorganic composite separator so that a content ratio of binder polymer/inorganic particles is non-continuously decreased from a surface of porous active layer toward the porous substrate.

First, a binder polymer is dissolved in a solvent to form a polymer solution, and inorganic particles are added and dispersed in the polymer solution to prepare various coating solutions having different contents of the inorganic particles. At this time, kinds of the binder polymer and the inorganic particles may be same or different in each of the coating solutions. A porous active layer having heterogeneity of morphology toward a thickness direction is prepared by repeatedly applying and drying each of the coating solutions on a surface of a porous substrate with a thin thickness, wherein the binder polymer/inorganic particles have different content ratios in the coating solutions. Binder polymer/inorganic particles in a finally applied coating solution should have a sufficiently high content ratio to improve characteristics of a battery during an assembly process of the battery. Then, binder polymer/inorganic particles in the coating solution, applied beneath the finally applied coating solution, should have a lower content ratio than that of binder polymer/inorganic particles present in the coating solution in a surface of the porous active layer. Meanwhile, polymer/inorganic particles in the coating solution, with which a surface of the porous substrate is coated so that the surface can be in contact to the coating solution, may have a higher content ratio than that of binder polymer/inorganic particles present in the coating solution of the intermediate layer. Such a non-continuous multiple coating layer may be formed of 2 layers, 3 layers or more, and the entire thickness of the multiple coating layer should be controlled within the known range so that the performances of a separator cannot be degraded.

All conventional binder polymers may be used as the binder polymer capable of being used to form the above-mentioned multiple coating layer, as long as they can be used to form a porous active layer. In particular, the binder polymer is preferably gelled when swelled with a liquid electrolyte, thereby to shows a high degree of swelling. Therefore, it is preferred to use a binder polymer having a solubility parameter of 15 to 45 $MPa^{1/2}$, and more preferably a solubility parameter of 15 to 25 $MPa^{1/2}$ and 30 to 45 $MPa^{1/2}$. Accordingly, hydrophilic polymers having a large number of polar groups are more advisable as the binder polymer compared to hydrophobic polymers such as polyolefin polymers. The binder polymer cannot be swelled sufficiently in a conventional aqueous electrolyte solution for a battery if the solubility parameter of the binder polymer is less than 15 $MPa^{1/2}$ or greater than 45 $MPa^{1/2}$.

As the second method, there is a method for forming a porous active layer having heterogeneity of morphology toward a thickness direction through a single coating process.

First, the above-mentioned first binder polymer is dissolved in a solvent to prepare a first polymer solution (S1). The first binder polymer includes together at least one functional group selected from the group consisting of carboxy, maleic anhydride and hydroxy; and at least one functional group selected from the group consisting of cyano and acrylate. Therefore, it is possible to improve physical properties of the resultant organic/inorganic composite separator, and to control phase inversion.

Subsequently, inorganic particles added and dispersed in a first binder polymer solution (S2). The solvent having a solubility parameter similar to that of the binder polymer as well as a low boiling point is preferred. This is why the solvent is uniformly mixed with the polymer and removed easily after coating the binder polymer. A non-limiting example of the solvent that may be used include, but is not limited to, acetone, tetrahydrofuran, methylene chloride, chloroform, dimethylformamide, N-methyl-2-pyrrolidone (NMP), cyclohexane, water and mixtures thereof. It is preferred to perform a step of pulverizing inorganic particles after adding the inorganic particles to the polymer solution. At this time, the time required for pulverization is suitably 1-20 hours, and the particle size of the pulverized particles ranges preferably from 0.001 and 10 µm, as described above. Conventional pulverization methods may be used, and a method using a ball mill is particularly preferred. There are no particular limitations in composition of the mixture composed of the inorganic particles and the polymer. Therefore, it is possible to control thickness, pore size and porosity of the finally produced organic/inorganic composite separator of the present invention. That is to say, the porosity of the organic/inorganic composite separator according to the present invention is increased with increase in a ratio (ratio=I/P) of inorganic particles (I) to a polymer (P), indicating that the thickness of the organic/inorganic composite separator is improved in the same solid content (weight of inorganic particles+weigh of a binder polymer). Also, the pore size of the organic/inorganic composite separator is increased with increase in an ability to form pores among the inorganic particles. At this time, the pore size of the organic/inorganic composite separator is increased since an interstitial distance among inorganic materials is increased with increase in a size (a diameter) of the inorganic particles.

Then, a porous substrate is directly coated with, or a separate support is coated with a solution of a first binder polymer having inorganic particles dispersed therein, and the coated porous substrate or support is dried. Here, the heterogeneity of morphology toward a thickness direction is determined according to components and coating conditions of the binder polymer. That is to say, the heterogeneity of morphology in the porous active layer is formed according to the components and the suitable coating condition (in particular, moisture) of the binder polymer. If a polymer having a high polarity, for example the first binder polymer, is mixed with inorganic materials to prepare a mixed solution of the binder polymer/inorganic particles and the porous substrate is then coated with the mixed solution under a suitable moisture condition, the polymer having a high polarity is present in a surface of the porous active layer as a result of a phase inversion. That is to say, a relative density of the binder polymer is gradually decreased from a surface of the active layer toward a thickness direction. At this time, the moisture condition, required for coating the porous substrate, ranges from 5 to 80% (a relative moisture, room temperature), and preferably from 20 to 50%. The heterogeneity of morphology in the active layer is not accomplished if the moisture condition is less than 5%, while the formed active layer has a very loose adhesion force and an excessively high porosity if the moisture condition is greater than 80%, resulting in easy peeling of the active layer.

In order to improve electrochemical stability of a porous active layer to be formed, it is preferred to further dissolve a second binder polymer having a solubility parameter of 17 to 27 $MPa^{1/2}$ in the above-mentioned first binder polymer solution. Specific kinds and preferred content ratios of the first binder polymer and the second binder polymer are the same as described above.

As the method for coating a porous substrate with the solution of the binder polymer having inorganic particles dispersed therein, conventional methods well known to the art may be used. For example, the conventional methods include a dip coating, a die coating, a roll coating, a comma coating or combination thereof. Also, the porous active layer may be selectively formed in one side or both sides of the porous substrate.

The organic/inorganic composite separator of the present invention, prepared thus, may be used as an electrochemical device, preferably a separator of a lithium secondary battery. At this time, if a polymer, which can be swelled by uptake of liquid electrolytes, is used as the component of the binder polymer, it can act as a gel-type polymer electrolyte since the polymer is gelled by reaction of the polymer to the electrolyte solution injected after assembly process of a battery using the separator.

Also, the present invention provides an electrochemical device including: (a) a cathode; (b) an anode; (c) an organic/inorganic composite separator interposed between the cathode and the anode and having a porous active layer formed therein according to the present invention, wherein the porous active layer has heterogeneity of composition morphology toward a thickness direction; and (d) an electrolyte.

The electrochemical devices include any devices in which electrochemical reactions may occur, and a specific example of the electrochemical devices includes all kinds of primary batteries, secondary batteries, fuel cells, solar cells or capacitors. In particular, it is preferred to use lithium secondary batteries among the secondary batteries including a lithium metal secondary battery, a lithium ion secondary battery, a lithium polymer secondary battery or a lithium ion polymer secondary battery.

The electrochemical device may be manufactured according to conventional methods well known to the art. According to one embodiment of the manufacturing method of the electrochemical device, an electrochemical device may be manufactured by interposing the above-mentioned organic/inorganic composite separator between a cathode and an anode and injecting an electrolyte solution into a battery.

There is no limitation in the electrodes which may be used together with an organic/inorganic composite separator of the present invention, and the electrodes may be manufactured by settling electrode active materials on a current collector according to one of the conventional methods known to one skilled in the art. Among the electrode active materials, a non-limiting example of cathode active materials may include any conventional cathode active materials currently used in a cathode of a conventional electrochemical device, and particularly preferably includes lithium manganese oxides, lithium cobalt oxides, lithium nickel oxides, lithium iron oxides or lithium composite oxides thereof. Additionally, a non-limiting example of anode active materials may include any conventional anode active materials currently used in an anode of a conventional electrochemical device, and particularly preferably include lithium intercalation materials such as lithium metal, lithium alloys, carbon, petroleum coke, activated carbon, graphite or other carbonaceous materials. A non-limiting example of a cathode current collector includes foil formed of aluminum, nickel or a combination thereof. A non-limiting example of an anode current collector includes foil formed of copper, gold, nickel, copper alloys or a combination thereof.

The electrolyte solution that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an salt containing an anion selected from the group consisting of $PF_6^-$, $BF_4^-$, $Cl^-$, $Br_-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (y-butyrolactone) and mixtures thereof. However, the electrolyte solution that may be used in the present invention is not limited to the above examples.

More particularly, the electrolyte solution may be injected in a suitable step during the manufacturing process of a battery, according to the manufacturing process and desired properties of a final product. In other words, the electrolyte solution may be injected before a battery is assembled or in a final step of the assembly process of a battery.

In addition to the general winding process, a stacking process and a folding process may be used as the process using the organic/inorganic composite separator of the present invention in a battery, wherein the stacking process is laminating an electrode on a separator. In particular, the organic/inorganic composite separator of the present invention has an advantage that it may be easily used during the assembly process of a battery since a binder polymer is present in a relatively large amount in a surface region of an organic/inorganic composite active layer. At this time, adhesion force may be controlled according to the content of main components, for example inorganic particles and a polymer, or the physical properties of the polymer, and the organic/inorganic composite separator of the present invention is easily adhered to an electrode especially if the above-mentioned first binder polymer is used as the binder polymer.

Hereinafter, preferred embodiments of the present invention will be described in detail for better understandings, with reference to the accompanying drawings. However, the description proposed herein is just a preferable example for the purpose of illustrations only, not intended to limit the scope of the invention.

EXAMPLES 1 TO 6

Preparation of Organic/Inorganic Composite Separator and Lithium Secondary Battery

Example 1

1-1. Preparation of Organic/Inorganic [(PVdF-CTFE/Cyanoethylpullulan)/BaTiO$_3$] Composite Separator A polyvinylidene fluoride-chlorotrifluoroethylene copolymer (PVdF-CTFE) and cyanoethylpullulan were added to acetone at contents of 10% by weight and 2% by weight, respectively, and dissolved at 50 □ for about 12 hours to prepare a polymer solution. A BaTiO$_3$ powder was added to the prepared polymer solution to a weight ratio of 20/80 weight ratio of the polymer mixture/BaTiO$_3$, and then the BaTiO$_3$ powder was ground and dispersed for at least 12 hours using a ball mill, thereby to prepare a slurry. A particle diameter (particle size) of BaTiO$_3$ in the slurry prepared thus may be adjusted according to the size of a bid used in the ball mill and the time used in the ball mill, but the BaTiO$_3$ powder was ground to a particle diameter of about 400 nm to prepare a slurry in this Example 1. A polyethylene separator (porosity of 45%) having a thickness of 18 μm was coated with the prepared slurry under a moisture condition of 30% relative humidity using a dip coating process, and a coating thickness of the polyethylene separator was adjusted to a thickness of about 4 μm. An average size of pores in the active layer of the coated polyethylene separator was about 0.4 μm, and its porosity was 57%.

1-2. Preparation of Lithium Secondary Battery
(Preparation of Anode)
To N-methyl-2-pyrrolidone (NMP) as a solvent, 96% by weight of carbon powder as an anode active material, 3% by weight of PVDF (polyvinylidene fluoride) as a binder and 1% by weight of carbon black as a conductive agent were added to prepare a mixed slurry for an anode. A Cu thin film having a thickness of 10 μm as an anode collector was coated with the missed slurry and dried to prepare an anode. Then, the anode was subject to a roll press.
(Preparation of Cathode)
To N-methyl-2-pyrrolidone (NMP) as a solvent, 92% by weight of lithium cobalt composite oxide (LiCoO$_2$) as a cathode active material, 4% by weight of carbon black as a conductive agent and 4% by weight of PVDF (polyvinylidene fluoride) as a binder were added to prepare a mixed slurry for a cathode. An Al thin film having a thickness of 20 μm as a cathode collector was coated with the mixed slurry and dried to prepare a cathode. Then, the cathode was subject to a roll press.
(Preparation of Battery)
The cathode, the anode and the organic/inorganic composite separator, as obtained as described above, were stacked to form an assembly. Then, an electrolyte solution (ethylene carbonate (EC)/ethylene methyl carbonate (EMC)=½ (by volume ratio) containing 1 M of lithium hexafluorophosphate (LiPF$_6$)) was injected into the battery assembly to prepare a lithium secondary battery.

Example 2

Example 1 was repeated to prepare an organic/inorganic [(PVdF-CTFE/cyanoethylpolyvinylalcohol)/BaTiO$_3$] composite separator and a lithium secondary battery having the separator, except that cyanoethylpolyvinylalcohol was used instead of cyanoethylpullulan.

Example 3

Example 1 was repeated to prepare an organic/inorganic [(PVdF-CTFE/cyanoethylsucrose)/BaTiO$_3$] composite separator and a lithium secondary battery having the separator, except that cyanoethylsucrose was used instead of cyanoethylpullulan.

Example 4

Example 1 was repeated to prepare an organic/inorganic [(PVdF-HFP/cyanoethylpullulan)/BaTiO$_3$] composite separator and a lithium secondary battery having the separator, except that PVdF-HFP was used instead of PVdF-CTFE.

Example 5

Example 4 was repeated to prepare an organic/inorganic [(PVdF-HFP/cyanoethylpullulan)/PMNPT] composite separator and a lithium secondary battery having the separator, except that a PMNPT powder was used instead of the BaTiO$_3$ powder.

Example 6

Example 4 was repeated to prepare an organic/inorganic [(PVdF-HFP/cyanoethylpullulan)/BaTiO$_3$-Al$_2$O$_3$] composite separator and a lithium secondary battery having the separator, except that a mixed powder of BaTiO$_3$ and Al$_2$O$_3$ (a weight ratio: 90/10) was used instead of the BaTiO$_3$ powder.

Comparative Example 1

Example 1 was repeated to prepare a lithium secondary battery, except that a conventional polyethylene (PE) separator was used herein.

Analysis of Physical Properties of Organic/Inorganic Composite Separator

In order to analyze a surface of the organic/inorganic composite separator prepared according to the present invention, and a cross section of the active layer, a test was carried out, as described in the following.

The organic/inorganic composite separator [(PVdF-CTFE/cyanoethylpullulan)/BaTiO$_3$] prepared in Example 1 was used as a test sample, and a separator having a porous active layer was used as a control, the separator being formed so that it is not capable of having heterogeneity of morphology toward a thickness direction using PVdF-CTFE alone instead of the 2-compoment binder polymer prepared in Example 1.

Figure 2:
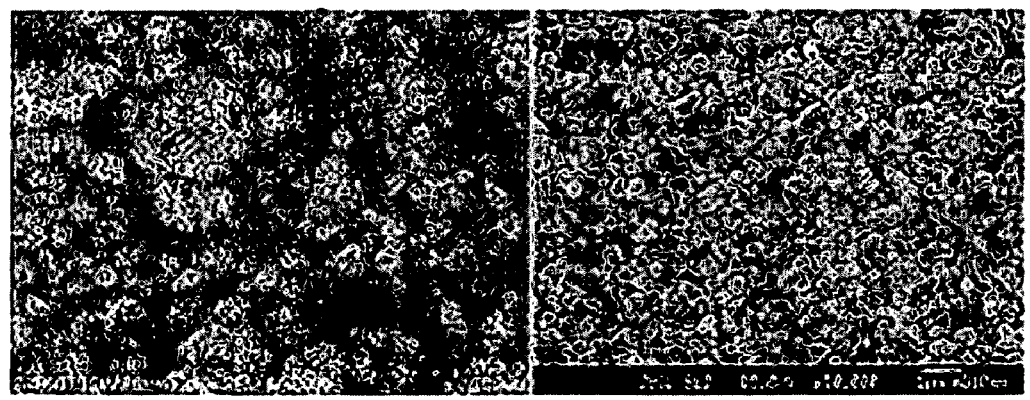
FIG. 2 is a photograph, taken by a scanning electron microscope (SEM), showing the organic/inorganic composite separator. Here.

The surfaces of the separators were analyzed using a scanning electron microscope (SEM). As a result, it was revealed that the organic/inorganic composite separator of the present invention includes an active layer and a support, wherein regular pores having a diameter of 1 μm or less are present in both of the active layer and the support (see FIG. 2A and FIG. 3A). Unlike the control separators in which most inorganic materials are observed on the surfaces (see FIG. 2B, FIG. 3B), it was seen that the inorganic particles and the polymer layer are well-distributed in a quite amount on the surface of the organic/inorganic composite separator prepared in Example 1 (see FIG. 2A).

Figure 3:
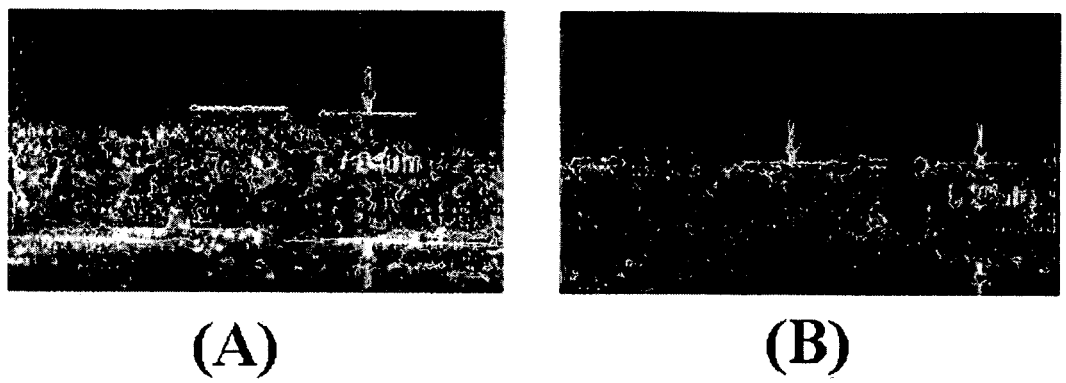
FIG. 3 is a photograph, taken by a scanning electron microscope (SEM), showing the organic/inorganic composite separator. Here.

FIG. 3 shows an SEM result showing a cross section of the organic/inorganic composite separators prepared in Example 1 and the control, respectively. It was seen that the polymer is present in a higher amount on a surface of the active layer than inside of the active layer in the case of the organic/inorganic composite separator of Example 1 (see FIG. 3A). On the contrary, it was seen that the control has a homogenous composition on the surface as well as inside of the active layer (see FIG. 3B). From the photographic results of the surfaces and cross sections of the above-mentioned separators, it was revealed that the organic/inorganic composite separator of the present invention has morphology heterogeneity, namely a morphology gradient formed in the active layer. Also, it was seen that the organic/inorganic composite separator of Example 1 has an improved surface peeling resistance due to the specific composition morphology (see FIG. 4A), compared to that of the separator including the composite coating layer composed of conventional inorganic materials and a polymer (see FIG. 4B).

Meanwhile, in order to objectively evaluate a lamination characteristic toward electrodes in the separator, two separators were adhered to each other at 100° C. under a pressure of 5.0 kgf/cm$^2$ to measure an adhesion force between the separators. As a result, it was revealed that an adhesion force of the control organic/inorganic composite separator is proven to be 3 gf/cm or less. Actually, the control separator was not easily laminated to the electrodes.

Figure 5:
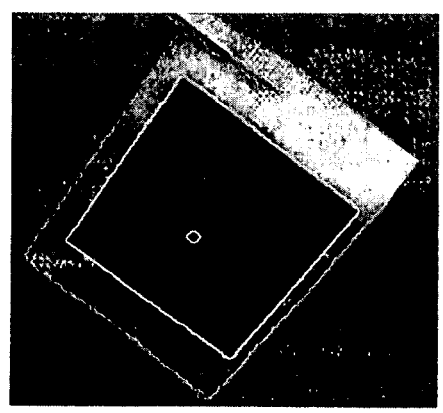
FIG. 5 is a photograph taken after an organic/inorganic composite separator prepared in Example 1 is laminated into an electrode, wherein the organic/inorganic composite separator has a porous active layer formed therein, the porous active layer having heterogeneity of morphology toward a thickness direction.

On the contrary, it was revealed that an adhesion force between the organic/inorganic composite separators prepared in Example 1 is high (10 gf/cm or more). Actually, the separator of Example 1 has a good lamination characteristic toward electrodes (see FIG. 5).

Evaluation for Performance of Lithium Secondary Battery

The lithium secondary batteries including the organic/inorganic composite separator prepared in the present invention were evaluated for a high rate discharge characteristic, as follows.

The lithium secondary batteries prepared in Examples 1 to 6 and the control battery prepared in Comparative example 1 were used herein.

Each of the batteries having a battery capacity of 960 mAh was subject to cycling at a discharge rate of 0.5C, 1C and 2C. The discharge capacities of the batteries are listed in the following Table 1, wherein the capacity is expressed on the C-Rate basis.

From the experimental results, it was revealed that each of the batteries of Examples 1 to 6 including the separator having a morphology gradient shows a high-rate discharge (C-rate) characteristic comparable to that of the battery of Comparative example 1 including the conventional polyolefin separator in which the active layer is not coated until the discharge rate of 2C (see Table 1).

TABLE 1

| Discharge Rate | Example 1 | Example 2 | Example 3 | Example 4 | Example 5 | Example 6 | Comparative example 1 |
|---|---|---|---|---|---|---|---|
| 0.5C | 954 | 955 | 953 | 954 | 952 | 956 | 956 |
| 1C | 944 | 945 | 942 | 943 | 944 | 945 | 945 |
| 2C | 891 | 892 | 889 | 891 | 893 | 892 | 893 |

INDUSTRIAL APPLICABILITY

As described above, the organic/inorganic composite separator of the present invention may be useful to enhance peeling and scratch resistances of the porous active layer and improve a lamination characteristic toward electrodes by introducing a porous active layer onto a porous substrate having pores, the porous active layer having heterogeneity of morphology toward a thickness direction in which a content ratio of the binder polymer/inorganic particles present in a surface layer is higher than that of the binder polymer/inorganic particles present inside the surface layer. Accordingly, the stability and performances of a battery can be improved together since the detachment of inorganic particles from the porous active layer may be reduced during the assembly process of the electrochemical device.

What is claimed is:

1. An organic/inorganic composite separator comprising:
   (a) a porous substrate having pores; and
   (b) a porous active layer containing a mixture of inorganic particles and a binder polymer with which at least one surface of the porous substrate is coated,
   wherein the porous active layer shows heterogeneity of composition morphology toward a thickness direction in which a content ratio of the binder polymer/inorganic particles present in a surface region of the porous active layer is higher than that of the binder polymer/inorganic particles present inside the porous active layer.

2. The organic/inorganic composite separator according to claim 1, wherein the binder polymer interconnects and fixes the inorganic particles and pores are formed in the porous active layer due to the presence of interstitial volumes among the inorganic particles.

3. An electrochemical device comprising a cathode, an anode, a separator and electrolytes, wherein the separator is the organic/inorganic composite separator as defined in claim 2.

4. The organic/inorganic composite separator according to claim 1, wherein the inorganic particles are selected from the group consisting of inorganic particles having a dielectric constant of 5 or more, inorganic particles having lithium ion conductivity, and a mixture thereof.

5. The organic/inorganic composite separator according to claim 4, wherein the inorganic particles having a dielectric constant of 5 or more are selected from the group consisting of $BaTiO_3$, $Pb(Zr,Ti)O_3$ (PZT), $Pb_{1-x}La_xZr_{1-y}O_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$, and mixtures thereof.

6. The organic/inorganic composite separator according to claim 5, wherein the inorganic particles having a dielectric constant of 5 or more are selected from the group consisting of $BaTiO_3$, $Pb(Zr,Ti)O_3$ (PZT), $Pb_{1-x}La_xZr_{1-y}Ti_yO_3$(PLZT), $PB(Mg_3Nb_{2/3})O_3$—$PbTiO_3$(PMN-PT), hafnia ($HfO_2$), and mixtures thereof.

7. An electrochemical device comprising a cathode, an anode, a separator and electrolytes, wherein the separator is the organic/inorganic composite separator as defined in claim 6.

8. The organic/inorganic composite separator according to claim 4, wherein the inorganic particles having lithium ion conductivity are selected from the group consisting of lithium phosphate ($Li_3PO_4$), lithium titanium phosphate ($Li_xTi_y(PO_4)_3$, $0<x<2$, $0<y<1$, $0<z\ y<3$), lithium aluminum titanium phosphate ($Li_xAl_yTi_z(PO_4)_3$, $0<x<2$, $0<y<1$, $0<z<3$), $(LiAl-TiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, $P_2S_5$ ($Li_xP_yS_z$, $0<x<3$, $0<y<3$, $0<z<7$) type glass, and mixtures thereof.

9. An electrochemical device comprising a cathode, an anode, a separator and electrolytes, wherein the separator is the organic/inorganic composite separator as defined in claim 4.

10. The organic/inorganic composite separator according to claim 1, wherein the inorganic particles have a particle diameter of 0.001 to 10 μm.

11. The organic/inorganic composite separator according to claim 1, wherein the binder polymer comprises a first binder polymer containing together at least one functional group selected from the group consisting of carboxy, maleic anhydride and hydroxy; and at least one functional group selected from the group consisting of cyano and acrylate.

12. The organic/inorganic composite separator according to claim 11, wherein the first binder polymer contains a hydroxy group and a cyano group together.

13. The organic/inorganic composite. separator according to claim 12, wherein the first binder polymer is selected from the group consisting of cyanoethylpullulan, cyanoethylpolyvinylalcohol, cyanoethylcellulose, cyanoethylsucrose and mixtures thereof.

14. An electrochemical device comprising a cathode, an anode, a separator and electrolytes, wherein the separator is the organic/inorganic composite separator as defined in claim 12.

15. The organic/inorganic composite separator according to claim 11, wherein the binder polymer further comprises a second binder polymer having a solubility parameter of 17 to 27 $MPa^{1/2}$.

16. The organic/inorganic composite separator according to claim 15, wherein the second binder polymer contains a functional group selected from the group consisting of halogen, acrylate, acetate and cyano.

17. The organic/inorganic composite separator according to claim 15, wherein the second binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate and cellulose acetate propionate.

18. The organic/inorganic composite separator according to claim 15, wherein a content ratio of the first binder polymer the second binder polymer ranges from 0.1:99.9 to 99.9:0.1.

19. An electrochemical device comprising a cathode, an anode, a separator and electrolytes, wherein the separator is the organic/inorganic composite separator as defined in claim 15.

20. An electrochemical device comprising a cathode, an anode, a separator and electrolytes, wherein the separator is the organic/inorganic composite separator as defined in claim 11.

21. The organic/inorganic composite separator according to claim 1, wherein a gel polymer electrolyte is formed by swelling the binder polymer in an electrolyte solution to be used.

22. The organic/inorganic composite separator according to claim 1, wherein the porous active layer has an adhesion force of 5 gf/cm or more when the organic/inorganic composite separators adhere to each other at a temperature of 100°C. under a pressure of 5.0 $kgf/cm_2$.

23. An electrochemical device comprising a cathode, an anode, a separator and electrolytes, wherein the separator is the organic/inorganic composite separator as defined in claim 22.

24. The organic/inorganic composite separator according to claim 1, wherein the porous active layer has a thickness of 0.01 to 100 μm, a pore size of 0.001 to 10 μm and a porosity of 5 to 95%.

25. An electrochemical device comprising a cathode, an anode, a separator and electrolytes, wherein the separator is the organic/inorganic composite separator as defined in claim 24.

26. The organic/inorganic composite separator according to claim 1, wherein the porous substrate having pores is a polymer selected from the group consisting of
polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, high-density polyethylene, low-density polyethylene, linear low-density polyethylene, ultrahigh molecular weight polyethylene and polypropylene.

27. An electrochemical device comprising a cathode, an anode, a separator and electrolytes, wherein the separator is the organic/inorganic composite separator as defined in claim 26.

28. The organic/inorganic composite separator according to claim 1, wherein the porous substrate has a thickness of 1 to 100 μm, a pore size of 0.01 to 50 μm and a porosity of 10 to 95%.

29. An electrochemical device comprising a cathode, an anode, a separator and electrolytes, wherein the separator is the organic/inorganic composite separator as defined in claim 1.

30. A method for manufacturing an organic/inorganic composite separator comprising a porous active layer, the method comprising:
(S1) preparing a solution of a first binder polymer containing together at least one functional group selected from the group consisting of carboxy, maleic anhydride and hydroxy; and at least one functional group selected from the group consisting of cyano and acrylate;
(S2) adding inorganic particles to the solution of the first binder polymer and dispersing the inorganic particles in the solution of the first binder polymer;
(S3) coating the solution of the first binder polymer having inorganic particles dispersed therein with a film and drying the coated film, wherein the porous active layer shows heterogeneity of composition morphology toward a thickness direction in which a content ratio of the first binder polymer/inorganic particles present in a surface region of the porous active layer is higher than that of the first binder polymer/inorganic particles present inside the porous active layer.

31. The method for manufacturing an organic/inorganic composite separator according to claim 30, wherein the first binder polymer contains a hydroxy group and a cyano group together.

32. The method for manufacturing an organic/inorganic composite separator according to claim 31, wherein the first binder polymer is selected from the group consisting of cyanoethylpullulan, cyanoethylpolyvinylalcohol, cyanoethylcellulose, cyanoethylsucrose and mixtures thereof.

33. The method for manufacturing an organic/inorganic composite separator according to claim 30, further comprising: dissolving a second binder polymer having a solubility parameter of 17 to 27 $MPa^{1/2}$ in the solution of the first binder polymer.

34. The method for manufacturing an organic/inorganic composite separator according to claim 33, wherein the second binder polymer contains a functional group selected from the group consisting of halogen, acrylate, acetate and cyano.

35. The method for manufacturing an organic/inorganic composite separator according to claim 34, wherein the second binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, pullulan and polyvinylalcohol.

36. The method for manufacturing an organic/inorganic composite separator according to claim 33, wherein a content ratio of the first binder polymer : the second binder polymer ranges from 0.1:99.9 to 99.9:0.1.

* * * * *